(12) United States Patent
Simonsson

(10) Patent No.: US 6,794,878 B2
(45) Date of Patent: Sep. 21, 2004

(54) DEVICE FOR DETECTING A FLOW OF POWDER PARTICLES

(75) Inventor: Lars Simonsson, Fagerfjall (SE)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/707,855

(22) Filed: Jan. 17, 2004

(65) Prior Publication Data

US 2004/0123675 A1 Jul. 1, 2004

Related U.S. Application Data

(63) Continuation of application No. 09/585,405, filed on Jun. 2, 2000, now Pat. No. 6,734,679, which is a continuation of application No. PCT/SE98/02152, filed on Nov. 27, 1998.

(30) Foreign Application Priority Data

Dec. 4, 1997 (SE) .............................................. 9704499

(51) Int. Cl.⁷ .............................................. G01N 27/60
(52) U.S. Cl. ..................................................... 324/452
(58) Field of Search ................................ 324/452, 455, 324/456, 509, 158.1; 239/306, 705; 428/570

(56) References Cited

U.S. PATENT DOCUMENTS 5,518,546 A * 5/1996 Williams et al. ............. 118/621
5,800,923 A * 9/1998 Amey et al. ................. 428/407

* cited by examiner

*Primary Examiner*—David A. Zarneke
*Assistant Examiner*—Trung Q. Nguyen
(74) *Attorney, Agent, or Firm*—Calfee, Halter & Griswold LLP

(57) ABSTRACT

A method and device is provided for detecting a flow of particles, particularly paint particles, in a powder transportation line connected to a powder spray gun. The powder transportation line of the device includes a portion having an interior face provided with an electrostatically friction-charging material. The portion of the transportation line may be located upstream or downstream of the pump or within the pump itself. The transportation line portion is in electrical communication with a unit for sensing electrical signals. When the powder particles flow through the transportation line portion, an electrical charge is generated in the portion as a result of the friction between the particles and the friction-charging material. This electrical charge is detected by the sensing unit.

5 Claims, 1 Drawing Sheet

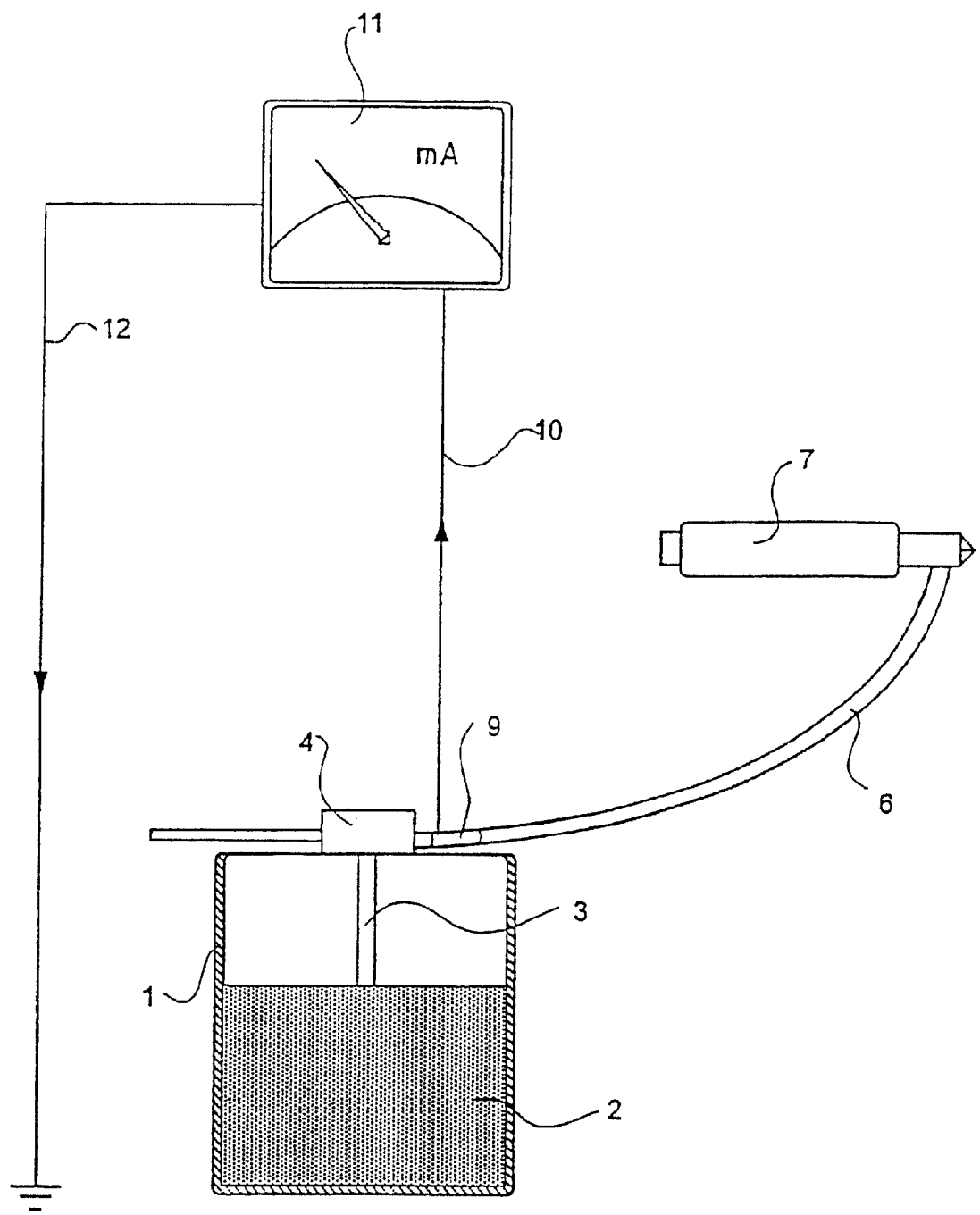

DEVICE FOR DETECTING A FLOW OF POWDER PARTICLES

CROSS REFERENCE TO RELATED APPLICATIONS

This application is a continuation of U.S. patent application Ser. No. 09/585,405, filed on Jun. 2, 2000, now U.S. Pat. No. 6,734,679 which is a continuation of International Patent Application Serial No. PCT/SE98/02152, filed Nov. 27, 1998 and which designated the U.S., and claims the benefit under 35 USC §119 of Swedish Application No. 9704499-4 filed on Dec. 4, 1997.

BACKGROUND OF INVENTION

The present invention relates to a device for detecting a flow of powder particles, particularly paint particles, said flow being arranged to flow in a transportation line between a reservoir holding powder particles and at least one powder spray gun of the kind wherein an electrical field charges the particles.

Electrostatic powder coating processes for application of paint-powder particles use spray guns of a kind wherein an electric field charges the paint powder particles, for instance guns known as corona guns. The powder particles are supplied to the gun from a powder reservoir by way of transportation lines. In industrial applications large dimension systems are often used wherein a plurality of guns and transportation lines, for instance in the number of 15, are arranged in parallel.

Problems arise when for some reason or other the paint powder particle flow is obstructed in the transportation line and the particles are prevented from reaching the gun. As a result, an insufficient amount of paint powder will reach the product to be coated.

When several guns are used simultaneously it is difficult to discern visually that a certain part of the product is coated to an insufficient degree with the powder for an acceptable layer of paint to be obtained in the subsequent heat treatment in an oven. Consequently, the fault is not corrected until the defect, i.e. the unsatisfactorily painted products, are discovered in the subsequent quality control step. Likewise, it is difficult to discern in which one of the guns that the obstruction occurs. For this reason it is often necessary to examine large parts of the transportation line system to find the fault. Fault-localizing and discarding are, however, time consuming and expensive.

SUMMARY OF INVENTION

The object of the present invention is to provide a simple and reliable device for detection of a flow of powder particles that may be used to monitor large transportation line systems.

This object is achieved in accordance with the present invention in a device of the kind defined in the introduction, which device is characterized in that a portion of the transportation line is provided on its interior face with an electrostatically friction-charging material, that a signal-carrying line interconnects a unit for measuring electrical signals and the electrostatically friction-charging material in said portion, and that said unit is provided with a third line to close the circuit between said unit and said material in said portion.

The electrostatically friction-charging material on the interior face of said transportation line portion is of such a nature that it is electrostatically charged by the friction arising upon contact between the powder particles of a flow streaming through the line and the material. The magnitude of the charge of the material is then measured by said unit for measuring electrical signals. In this manner the device in accordance with the invention provides a tool for detection of whether or not a particle flow is moving through the transportation line, since the measuring unit shows response only when particles flow through said portion of the transportation line.

The third line preferably is connected to earth.

In accordance with one embodiment of the invention all of said transportation line portion is manufactured from an electrostatically friction-charging material.

The powder flow can be generated by means of a pump that is connected to the transportation line.

Preferably, the electrostatically friction-charging portion of the line could be provided adjacent to the pump. It goes without saying that this portion of the line could be located upstream or downstream from the pump in the direction of travel of the powder flow. It could likewise be located inside the pump itself.

In large systems where several powder guns are arranged for simultaneous operation one detecting device in accordance with the invention may be arranged in each one of the transportation lines leading to the respective spray guns. The signals from each one of the measuring units of the respective detecting devices may be supplied to a control panel for system monitoring. Owing to this monitoring feature any flow obstruction in any one transportation line thus may be immediately detected and localized. Consequently, the fault may be remedied before it has led to production disturbances, and the fault-localizing time is reduced since the control panel will show in precisely which transportation line the fault is to be found.

In addition, the device in accordance with the invention is inexpensive and easy to install, in new as well as in existing transportation-line systems.

BRIEF DESCRIPTION OF DRAWINGS

The drawing FIGURE illustrates one embodiment of a device in accordance with the invention.

DETAILED DESCRIPTION

One embodiment of the device will be described in the following with reference to the drawing FIGURE. A receptacle 1 holding paint-powder particles 2 is connected to a spray gun of the kind known as a corona gun 7, designed to discharge a powder, via a transportation line 3, 6. A pump 4 is located along the transportation line 3, 6, at a point between the receptacle 1 and the gun 7. A portion 9 of the transportation line 3, 6 consists of an electrostatically friction-charging material. In the present case, the portion 9 is located adjacent to the pump 4. Via a signal-carrying line 10, the portion 9 is connected to an electrical-signal measuring unit. In the present case, the unit is an amperemeter 11. A third line 12 connects the amperemeter 11 to earth.

When the powder particles 2 are made to flow through the transportation line 3, 6, by means of the pump 4, the friction generated upon contact between the powder particles 2 and the friction-charging material in portion 9 produces a charge in that portion 9. This charge generates a current, which via the signal-carrying line 10 may be read from the amperemeter 11. The earthed line 12 is necessary to close the circuit to ensure that the amperemeter 11 continuously shows the current signal values.

If the flow of powder particles 2 in the transportation line 3, 6 were to be throttled or obstructed at any point on its travel from the receptacle 1 to the friction-charging material portion 9, no electric charge is generated in portion 9 and consequently the amperemeter 11 shows no response.

As will be appreciated the above embodiment may be modified in various ways within the scope of protection of the invention as the latter is defined in the appended claims. For instance, only the inner face of the line portion 9 may be coated with an electrostatically friction-charging material. The amperemeter 11 could be replaced by other types of electrical-signal measuring devices, such as a voltage meter. It goes without saying that the device may be used to detect a flow of powder particles of another kind than paint-powder particles. The gun 7 may be positively or negatively polarized and the line 12 should always be connected to earth.

What is claimed is:

1. An apparatus for detecting the flow of powder coating particles, said apparatus comprising:
    a. a reservoir for said powder coating particles;
    b. at least one powder spray gun;
    c. a transportation line for said powder coating particles extending from said reservoir to said at least one powder spray gun, a portion of said transportation line having an interior face comprising a material which becomes electrically charged by friction with said powder coating particles;
    d. a pump for said powder coating particles located along said transportation line;
    e. a unit for measuring electrical signals; and
    f. a signal carrying line interconnecting said unit and said portion of said transportation line which is electrically charged by friction, wherein said portion of said transportation line is located inside said pump.

2. The device of claim 1 wherein said gun is a corona gun.

3. The device of claim 2 wherein said unit comprises both a unit for measuring electrical signals and a unit for displaying said electrical signals to the user.

4. In an apparatus for electrostatic powder coating having a reservoir holding powder coating particles, at least one powder spray gun, a transportation line for said powder coating particles extending from said reservoir to said at least one powder spray gun wherein a portion of said transportation line has an interior face comprising a material that becomes electrically charged by friction with said powder coating particles, a pump for said powder coating particles located along said transportation line, and a unit for sensing electrical signals, a method for detecting the flow of powder coating particles, comprising the steps of:
    a. pumping powder coating particles from said reservoir through a transportation line to said at least one powder spray gun by means of said pump;
    b. locating within said pump said portion of said transportation line which has an interior face comprising a material that becomes electrically charged by friction with said powder coating particles;
    c. generating a triboelectric charge in said pump by causing powder coating particles flowing through said pump to contact said interior face; and
    d. utilizing said unit for sensing electrical signals to sense the triboelectric charge generated in said pump.

5. The method of claim 4 further comprising the step of displaying said electrical signals to the user.

* * * * *